United States Patent [19]

Shuey et al.

[11] 4,370,702
[45] Jan. 25, 1983

[54] MICROPROCESSOR CONTROL OF INVERTER POWER TRANSISTORS WITH DC CONTENT CORRECTION

[75] Inventors: Kenneth C. Shuey, Cridersville; Mark A. Rosswurm, Jackson Township, Hardin County, both of Ohio

[73] Assignee: Westinghouse Electric Corp., Pittsburgh, Pa.

[21] Appl. No.: 225,225

[22] Filed: Jan. 15, 1981

[51] Int. Cl.³ .................... H02P 13/20; H02M 1/12
[52] U.S. Cl. ........................................ 363/42; 363/98
[58] Field of Search ................ 318/811; 363/40–42, 363/98; 364/480, 492

[56] References Cited

U.S. PATENT DOCUMENTS

| | | | |
|---|---|---|---|
| 4,078,192 | 3/1978 | Fultz | 363/42 |
| 4,133,025 | 1/1979 | Wurzburg | 363/41 |
| 4,153,930 | 5/1979 | Marceau | 363/42 |
| 4,290,108 | 9/1981 | Woehrle | 363/41 |

FOREIGN PATENT DOCUMENTS 2039392  8/1980  United Kingdom ................ 363/42

OTHER PUBLICATIONS

Conference: PESC 1978 Record, Syracuse, N.Y., USA, pp. 243–250, (Jun. 13–15, 1978).
IEEE Transactions on Indust. Electr. & Control Instrumentation, vol. IECI-24, No. 1, pp. 100–108, Feb. 1977, S737703092, (363-40).

Primary Examiner—William H. Beha, Jr.
Attorney, Agent, or Firm—R. P. Lenart

[57] ABSTRACT

The switching intervals for the power transistors in a three-phase inverter are generated by a microprocessor. DC content control is provided separately for each phase by modulation of the duration of the switching intervals through adjustment of the length of the sequences of instructions carried out by the microprocessor.

10 Claims, 7 Drawing Figures

MICROPROCESSOR CONTROL OF INVERTER POWER TRANSISTORS WITH DC CONTENT CORRECTION

BACKGROUND OF THE INVENTION

1. Field of the Invention

This invention relates to electric power inverters of the type in which the switching devices which generate the AC waveform are controlled by digital pulse signals. In particular, the invention is directed to the generation of the pulse signals using a microprocessor and to the modification of the pulse signals to remove the DC content from the AC waveform.

2. Prior Art

Inverters are electrical devices incorporating an arrangement of electronic switches which are operated in a prearranged pattern to generate a single or multiphase AC output voltage of a desired frequency from a DC voltage input. Conventionally, analog signals generated by reactive elements have been used to control the electronic switches. Recently, attention has been directed to using digital signals to operate the electronic switches. In such an arrangement, the electronic switches are turned full on or off to generate a series of pulses in the output. The switching times are selected to form output pulses which, when filtered, produce a sinusoidal output waveform. In one such prior art inverter, the digital signals for generating a three-phase output waveform are formed by storing a series of binary numbers in a ROM (read only memory). A clock is used to sequentially output the stored numbers in a continuously repeating pattern. Selected bits in the outputted number control the conduction state of each of the electronic switches. Thus, by appropriate selection of the coded numbers, the desired inverter output pulse pattern is generated.

The electronic switches in an inverter are paired so that conduction by one switch in the pair generates the positive half cycle of the output current waveform and conduction by the other switch in the pair generates the negative half cycle. In order to generate the ideal waveform, each switch in the pair must be on for one half of the total duration of each cycle of the output waveform and off for one half the time, no matter how many pulses are generated per cycle. However, due to variations in the characteristics of the switches, such as switching time and saturation voltage, it is inevitable that one switch in a pair will generate more volt-seconds per half cycle than the other. Although this difference in volt-seconds generated is usually very small, over a period of time it results in the introduction of a DC component in the output waveform.

In the prior art digitally controlled inverter discussed above, any DC content detected in the output waveform is removed by adjusting the pulse width of two pulses in each phase exhibiting DC content. The pulse width is modulated by diverting the selected pulses through a circuit which lengthens or shortens the selected pulse depending upon the polarity of the detected DC content and the polarity of the pulse. For instance, if the DC content is positive and the pulse is positive, the pulse is shortened. In this arrangement, only the trailing edge of the pulse can be modified and the propagation time of the diverted pulse has to be selected such that it is reinserted in the pulse train at the proper instant.

SUMMARY OF THE INVENTION

According to the present invention, the switching signals for the electronic switches in an inverter are generated through the use of a microprocessor driven by clock pulses. The microprocessor performs selected sequences of operating instructions, each of which requires a predetermined number of clock pulses, and generates a binary output at the end of each sequence. The conduction states of the electronic switches are determined by the binary output. These outputs are selected such that one switch is always on and the other off on an alternating basis. The sequences of operating instructions performed by the microprocessor are selected so that the pulsed output generated by the electronic switches can be filtered to generate a sinusoidal output waveform. When a DC component is detected in the output waveform, the sequences of instructions performed by the microprocessor are modified. Those sequences generated when the pulsed output of the switches is of the same polarity as the DC component are shortened while the sequences generated when the polarity of the pulsed output is opposite to that of the DC component are lengthened. In this manner, the DC component is driven toward zero since a DC component of opposite polarity is purposely introduced.

In multiphase inverters, the sequences of operating instructions and binary outputs are selected such that the switches in each pair are switched at appropriate intervals to generate a sinusoidal multiphase output waveform when filtered. However, only one pair of electronic switches is switched with each binary output. This can be effected, for instance, in a three-phase inverter by selecting the switching intervals such that switching only occurs within plus or minus 30 electrical degrees of the zero crossing points of the waveform for each phase. Since only one pair of switches is operated at a time, the DC component in each phase can be dealt with individually by modifying the sequence of instructions which affect switching in that phase in the manner discussed above for a single-phase inverter.

On another level, the invention is directed to switching the electronic switches in an inverter at switching intervals which are multiples of clock pulse intervals. The switching intervals are selected such that the filtered output of the inverter is a sinusoidal waveform. Any DC component in the sinusoidal output waveform is detected and the switching intervals are modified by delaying the switching on of the electronic switch which generates an output of the same polarity as the DC component and by advancing the switching of the switch which generates an output of the opposite polarity to that of the DC component. In a multiphase system, only one set of electronic switches is operated by each switching interval so that any DC component in the separate phases can be dealt with individually in the same manner through adjustment of the appropriate switching intervals.

The invention encompasses both the methods of generating AC waveforms from DC sources and apparatus for carrying out those methods.

DESCRIPTION OF THE PREFERRED EMBODIMENT

Figure 1:
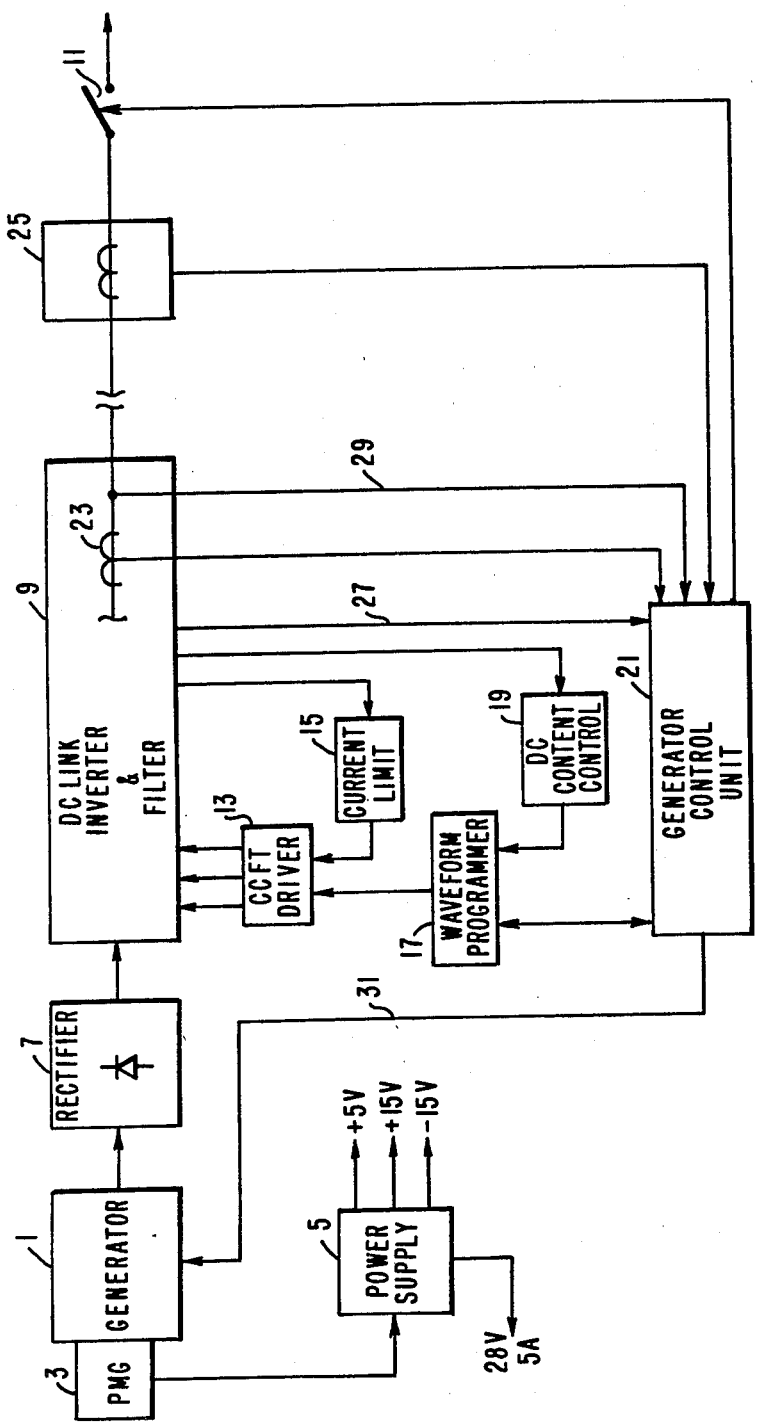
FIG. 1 is a schematic diagram in block diagram form of an inverter system incorporating the invention.

The invention will be described as applied to the AC power generation system shown in block diagram form in FIG. 1. A typical application for such a system is the AC power supply for an aircraft, although it should be understood that the invention has many other applications. In the aircraft system, the alternating current generator 1 is driven by the aircraft engine at a variable RPM, dependent upon the power setting of the engine. A permanent magnet generator (PMG) 3 on the main generator energizes a power supply 5 which provides the +5, +15 and −15 volt DC supply voltages required by the control system for the AC power system and supplies power for the aircraft 28-volt DC bus.

The output of the main generator 1, which varies in frequency with the RPM of the aircraft engine, is applied to a full wave rectifier 7 which, in turn, supplies DC power to a DC link inverter and filter 9. The DC link inverter and filter generates a three-phase, 400 hertz output which supplies power to the aircraft AC buses through a contactor 11. As will be more fully explained below, the DC link inverter contains a number of electronic switches which are switched off and on in accordance with a predetermined pattern to generate the AC output. Switching of the electronic switches is controlled by current controlled feedback transformers (CCFT) through the CCFT driver 13. An example of a CCFT driver is disclosed in U.S. Pat. No. 3,715,648. A current limiter 15 monitors the output current of each phase of the DC link inverter and filter 9 and regulates the CCFT driver to maintain the output current within preset limits in a manner which is known in the art.

The prearranged switching pattern followed by the CCFT driver 13 is generated by a waveform programmer 17. The programmer 17 repetitively generates pulses of durations selected to produce a three-phase, sinusoidal, filtered output from the DC link inverter and filter. A DC content control 19 individually monitors each phase of the inverter output and modulates the width of the appropriate pulses generated by the waveform programmer 17 to eliminate any DC components.

A generator control unit 21 provides overall system control and protection. On start-up, the generator control unit resets the waveform programmer 17. During operation, it monitors the output of the waveform programmer. It also senses feeder faults internally through current transformer 23 and externally through current transformer 25. Ground faults within the inverter are detected through line 27. The output voltages of the inverter are monitored by the generator control unit through line 29. Upon the detection of a fault, the generator control unit shuts down the generator 1 through line 31. The generator control unit 21 also controls the operation of the three-phase contactor 11 which connects the output of the AC power system to the aircraft AC buses.

Figure 2:
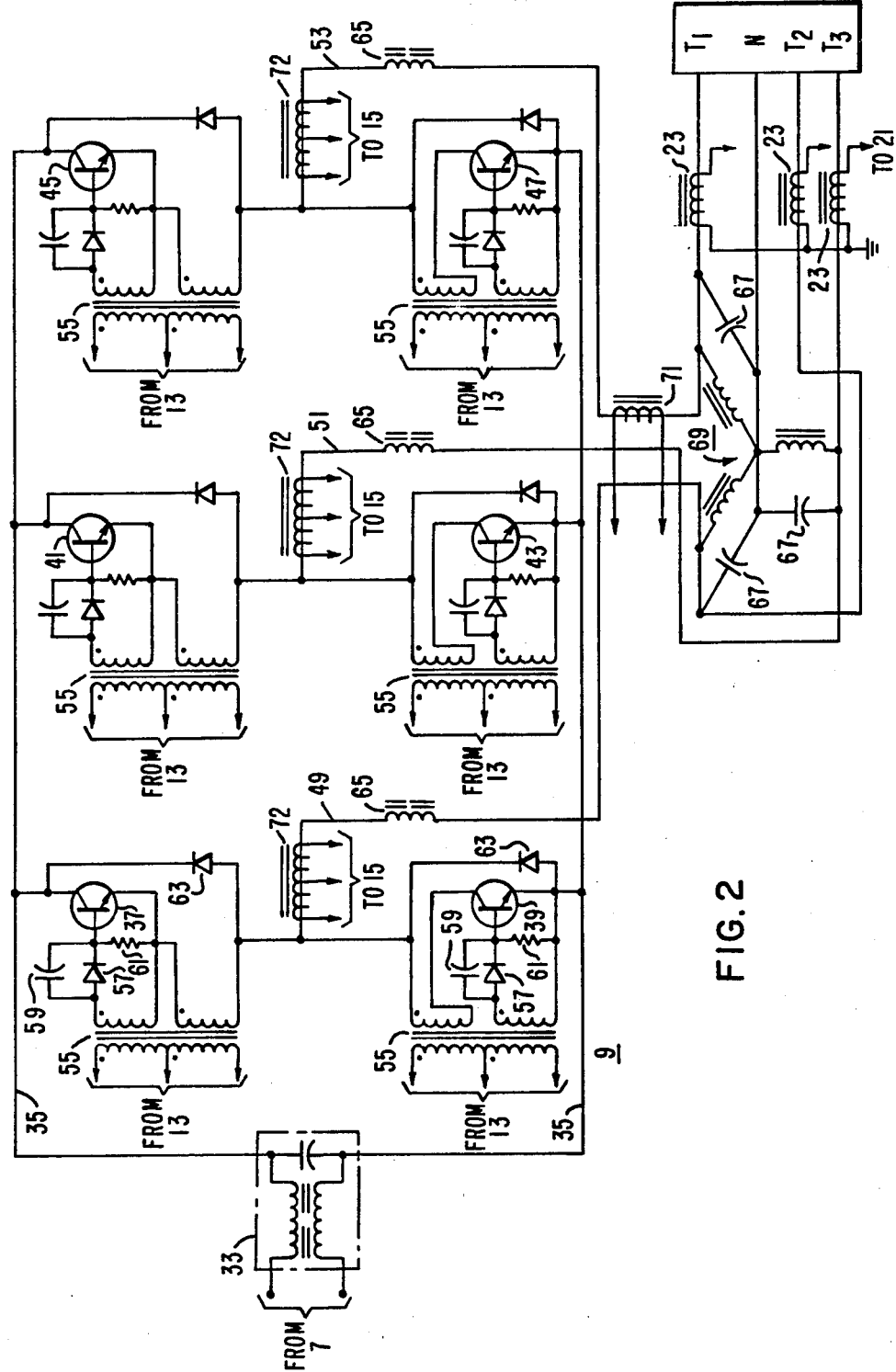
FIG. 2 is a schematic circuit diagram of a DC link inverter and filter used in the system of FIG. 1.

FIG. 2 illustrates a suitable DC link inverter with a filtered output which was identified in FIG. 1 by the general reference character 9. The DC output of the full wave rectifier 7 is passed through input filter 33 and applied to the inverter DC bus 35. Pairs of n-p-n transistors 37 and 39, 41 and 43, and 45 and 47 are each connected in series across the DC bus to generate a three-phase output on lines 49, 51, and 53 connected to the midpoint of each transistor pair, respectively. Each of the transistors is controlled by a signal from the CCFT driver 13 applied to a current coupled feedback transformer 55. Base drive current is provided to the respective transistors through a diode 57. A capacitor 59 and resistor 61 provide reverse bias to assure turn-off of each transistor. Base drive current is applied to one transistor in each pair at a time on an alternating basis so that first one and then the other is turned on. The on transistor in each pair is driven to saturation so that a pulsed output of first one polarity and then the other is generated on each of the lines 49, 51, and 53. As is standard practice, a dead band of short duration, during which both transistors in each pair are off, is provided during switching to prevent a short circuit through the switched transistor pair. Flyback diodes 63 are provided to carry the current during these intervals.

The pulsed outputs on lines 49, 51, and 53 are passed through a filter comprising the series connected chokes 65 and shunt capacitors 67 to produce a three-phase, sinusoidal output waveform. A transformer 69 connected across the three-phase output forms a neutral, N. Current transformers 23 individually connected to the lines 49, 51 and 53 after the filter provide the internal feeder fault sensing for the generator control unit 21. Another current transformer 71, which senses the current in all three lines 49, 51 and 53, provides the internal ground fault sensing for the generator control unit. Additional current transformers 72 connected individually to lines 49, 51 and 53 before the filter provide separate current sensing in each phase for the current limiter 15.

Figure 3:
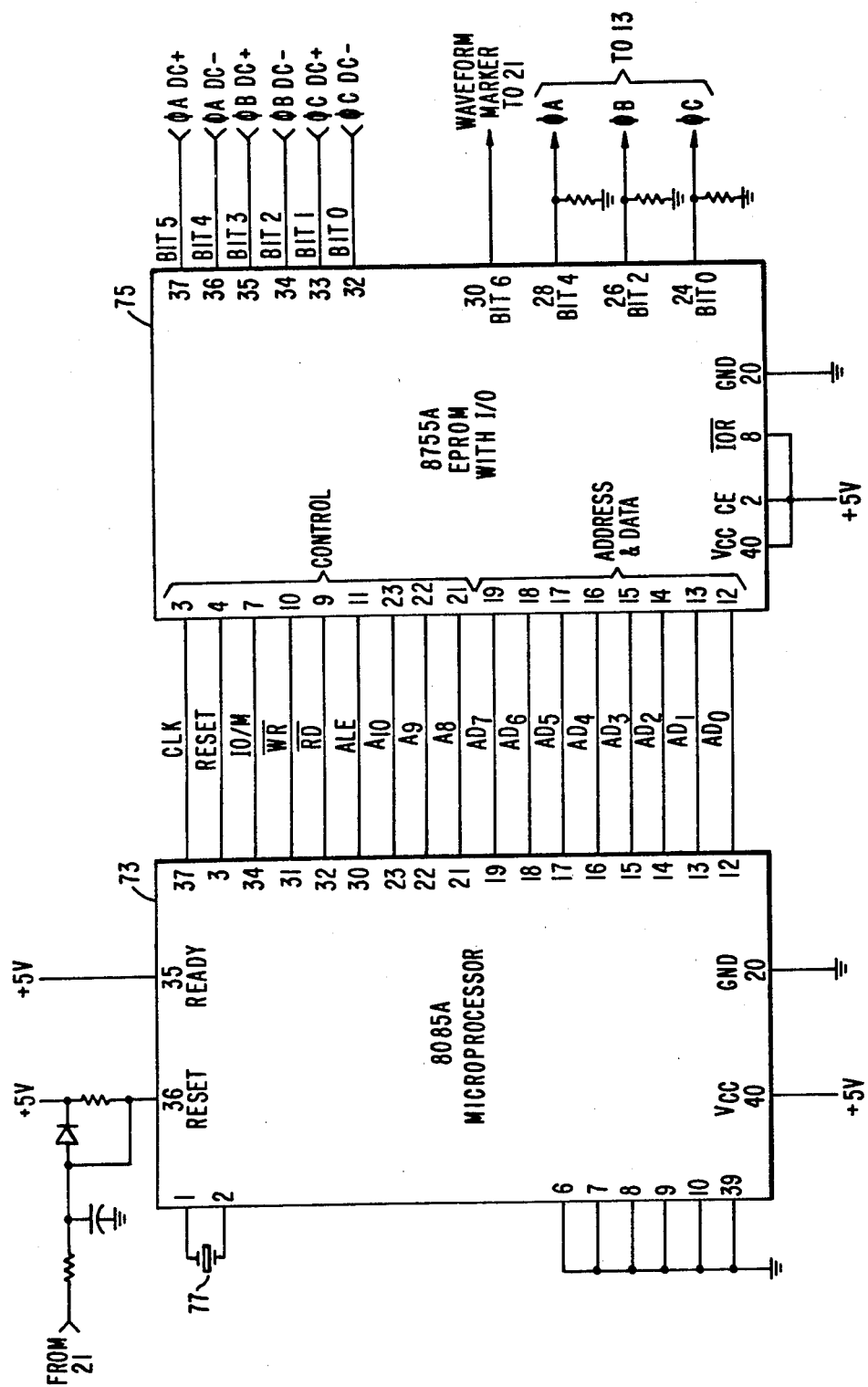
FIG. 3 is a schematic diagram of the waveform programmer used in the system of FIG. 1.

The waveform programmer 17 is illustrated in FIG. 3. It includes a microprocessor 73 and memory and input/output device 75. A suitable microprocessor is an 8085 single chip, 8 bit, n-channel central processing unit manufactured by Intel Corporation of Santa Clara, California. A suitable memory and input/output device 75 is the Intel 8755A, which is a 16,834 bit, erasable and electrically reprogrammable, read only memory (EPROM) and input/output chip with two ports individually programmable as input or output. Clock pulses for the microprocessor 73 are generated by a crystal oscillator 77. The 6.144 megahertz output of the crystal oscillator is divided down by the microprocessor to produce a clock frequency of 3.072 megahertz. Thus the cycle time at which the microprocessor executes instructions is 0.32552 microseconds.

As will be discussed in more detail below, the microprocessor 73 executes instructions which determine the duration of the switching intervals for inverter 9. The memory and input/output device 75 stores the software instructions, reads the DC content information and outputs the switching interval drive signals to the CCFT driver 13. As shown in FIG. 3, the interconnections between the microprocessor 73 and the memory and input/output device 75 are divided into control signals and address/data signals. The particular connections for the 8085 microprocessor and the 8755A EPROM with input/output are shown on the figure. An explanation of the control signals and the function of each pin are set forth in "MCS-80 T.M. User's Manual (with introduction to MCS-85 T.M. )" published by Intel Corporation in 1977. The signal from the generator control unit 21 applied to pin 36 of the microprocessor resets the program for start-up. The plus and minus DC content signals for the three phases of the inverter output are applied to the B port of the 8755A with one such signal applied to each of the first 6 bits of the port. Bit 0, 2 and 4 of the A port is used to output the inverter drive signals and bit 6 is used to output a waveform marker signal to the generator control unit 21.

Figure 4:
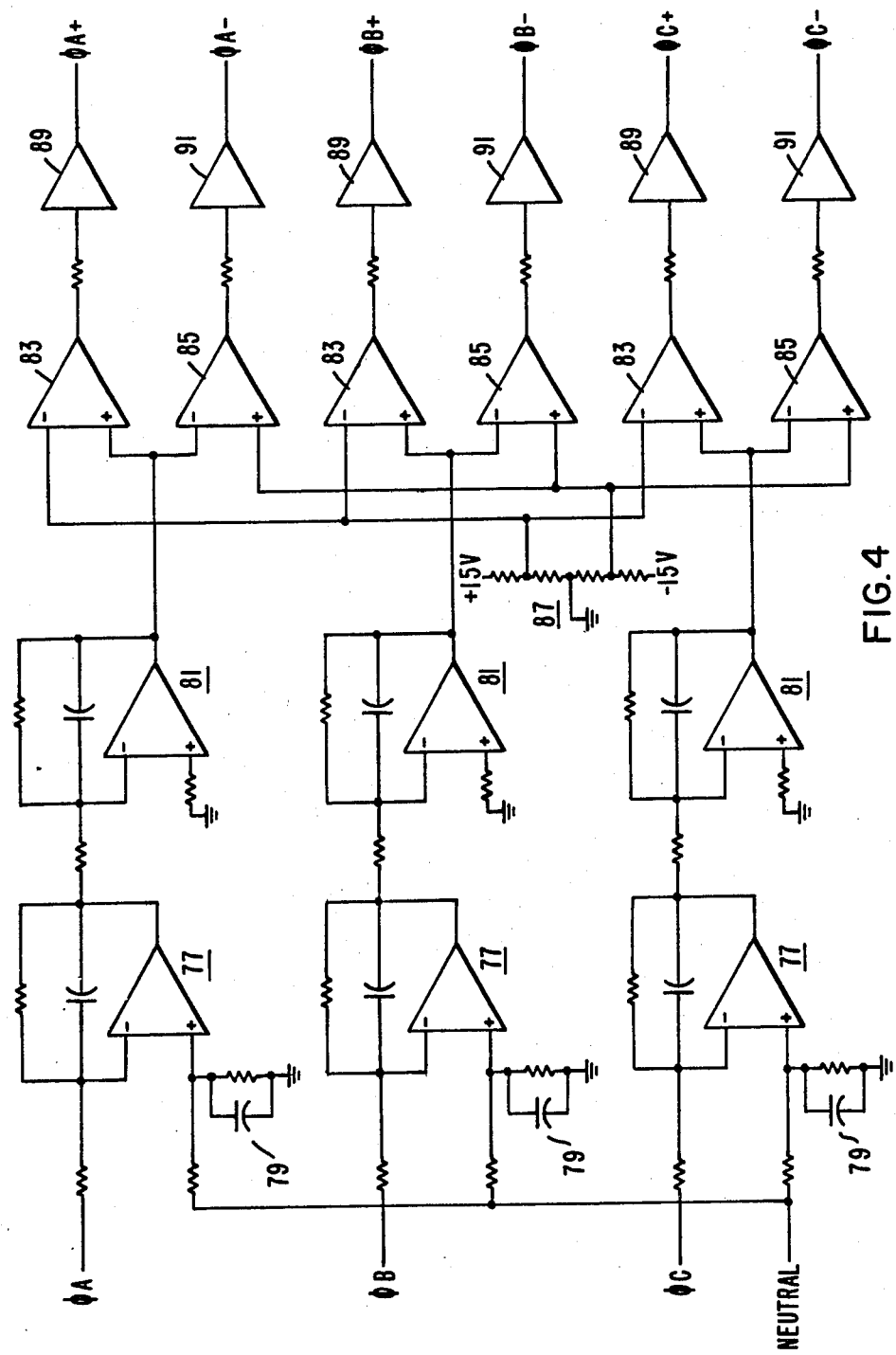
FIG. 4 is a schematic circuit diagram of the DC content control used in the inverter system of FIG. 1.

FIG. 4 illustrates a suitable circuit for the DC current control 19 of FIG. 1. Each phase voltage is applied to the inverting input of the operational amplifier in an integrator 77. The neutral line is connected to the noninverting input of each inverter. The values of the feedback and input resistors are selected to provide unity DC gain while a resistor-capacitor combination connected between the noninverting input and ground assures a low AC gain. Thus, the AC components of the phase voltages are largely removed by the integrators 77 and the DC component is passed on to the true inverters 81 which are designed for high DC gain. The integrators 81 essentially eliminate any remaining AC voltage while generating a signal representing the integral of the DC component. The output of each integrator 81 is applied to the noninverting input of one comparator 83 and the inverting input of a second comparator 85. Positive and negative reference voltages generated by a voltage divider 87 are applied to the inverting input of the comparators 83 and the noninverting input of the comparators 85, respectively. The outputs of the comparators 83 and 85 are, in turn, applied to inverting amplifiers 89 and 91, respectively. Thus the integrated DC component of each phase is compared with both a positive and negative reference voltage. If the integrated DC component in any phase does not exceed the threshold levels set by the reference voltages, the outputs of the inverting amplifiers 89 and 91 associated with that phase will both stay low. If, however, a positive DC component which exceeds the threshold is detected, the output of the associated inverting amplifier 89 will go high. Similarly, the output of the inverting amplifier 91 will go high if the integrated DC component exceeds the negative threshold voltage. While the output of the inverting amplifiers 89 and 91 associated with a particular phase may both be low, only one can go high at a time, indicating the presence of either a positive or negative DC component.

Figure 5:
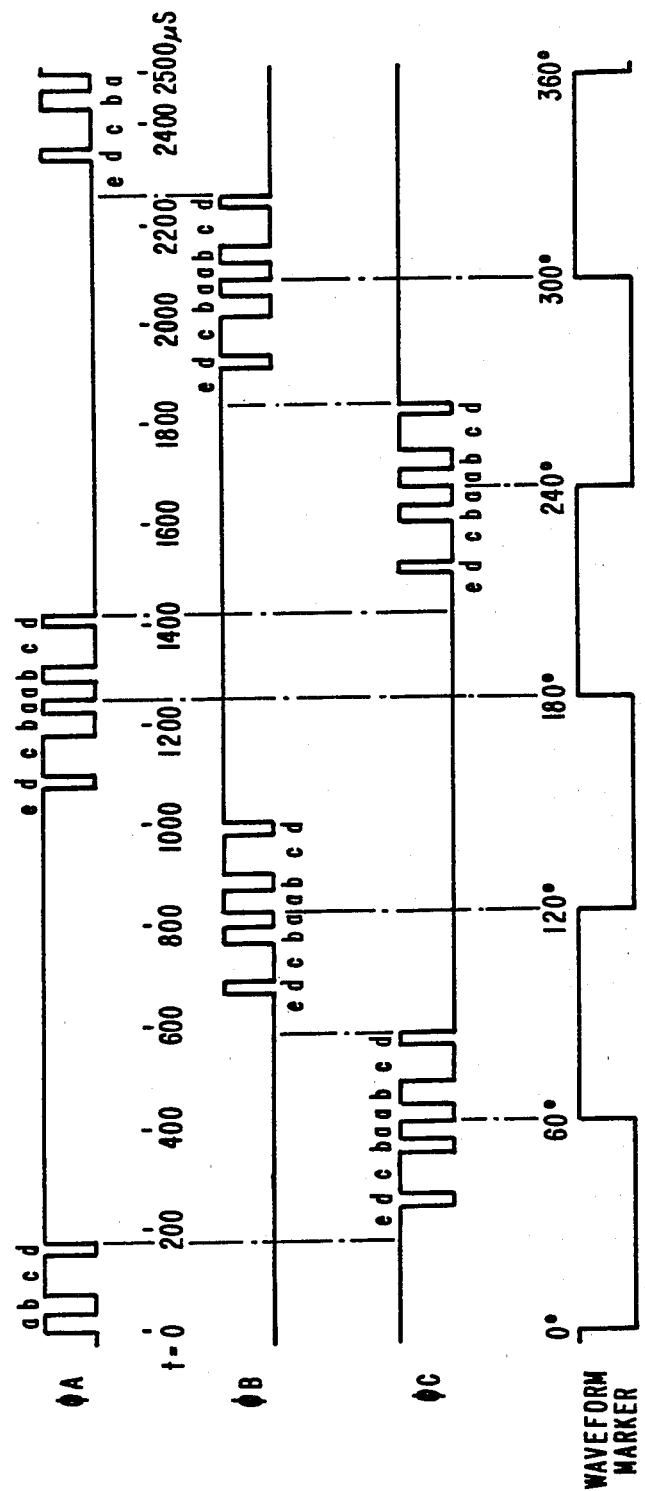
FIG. 5 is a diagram of the signals generated by the waveform programmer of FIG. 3 and the unfiltered waveform generated by the DC link inverter of FIG. 2.

FIG. 5 illustrates the output signals generated by the waveform programmer 17. The phase A, B and C signals are digitial signals which are switched between the 0 and 1 state at selected switching intervals. As can be seen from the drawings, there are only five basic intervals, a through e, which are combined to generate the entire pattern. Starting at time zero, the phase A signal switches between the high and low states for the intervals a through d and then remains high. After another interphase interval e, the phase C signal which went high at time zero switches between the high and low states for the intervals d through a, and then reverses the sequence a through d. After another interphase interval e, the phase B signal is switched through a similar mirror image sequence of intervals beginning at the low state and ending at the high state. As can be seen, each phase signal in sequence is switched nine times and, since the final output state reverses after each such sequence, two switching sequences are needed for each phase to complete a cycle. A total of 54 switching intervals must therefore be generated by the waveform programmer to complete a cycle for all three phases.

Since the waveform programmer signals are applied to the CCFT driver which, in turn, switches the transistors of the DC link inverter on and off for the indicated intervals, the phase A, B and C signals in FIG. 5 also represent the unfiltered inverter output waveforms with the waveform of each phase switching between the positive and negative output voltage values. For the aircraft electrical system being described, the frequency of the output waveform is 400 hertz so that each cycle is 2500 microseconds in duration. Since, as stated previously, each microprocessor clock pulse is 0.32552 microseconds in duration, there are 7680 clock pulses per cycle of the output waveform. The number of clock pulses for each of the switching intervals a through e were selected such that the resultant pulsed inverter output would produce a sinusoidal output signal when filtered with a minimum amount of harmonic distortion. The intervals selected were 109, 104, 246, 65 and 232 clock pulses for the intervals a through e, respectively. Other combinations of interval duration could, of course, be used, but the selected combination has been found to generate a very satisfactory output waveform.

As can be seen from FIG. 5, switching occurs in only one phase of the inverter output at a time. It can be appreciated that since each 9-interval switching sequence results in a reversal in the polarity of the associated phase voltage, the switching sequences are centered around the zero crossing points for the filtered output waveform. Thus, for instance, the switching sequences shown for the phase C waveform are centered at the 60° point where the voltage passes through zero in the negative going sense and at the 240° point where it passes through zero going positive. It will be noticed that the sequences are mirror images of each other about these zero crossing points. It will also be noticed that since each phase must be switched twice during a complete cycle for a total of six sequences, each sequence must be completed within 60 electrical degrees or within plus or minus 30° of the zero crossing points.

FIG. 5 also illustrates the waveform marker signal which is a 1200 hertz digital signal generated by the microprocessor with reversals of polarity occurring at the zero crossing points of the three-phase waveforms. This signal is used by the generator control unit to monitor the operation of the waveform programmer.

While the waveforms of FIG. 5 represent the unfiltered inverter output which would be generated by perfectly matched, ideal switches, in reality the switches in each inverter pair will undoubtedly have variations in their characteristics such as switching time or saturation voltage. These variations, although small, will result over a period of time in a difference in the volt-seconds of output generated by the two switches in the pair and will show up as a DC component in the output waveform. The DC content in each phase will depend upon the relative characteristics of the transistors in the pair associated with that phase and, therefore, must be adjusted individually. Since the waveform programmer only generates switching signals for one phase at a time, phase by phase correction for DC components can be easily accommodated.

Figure 6:
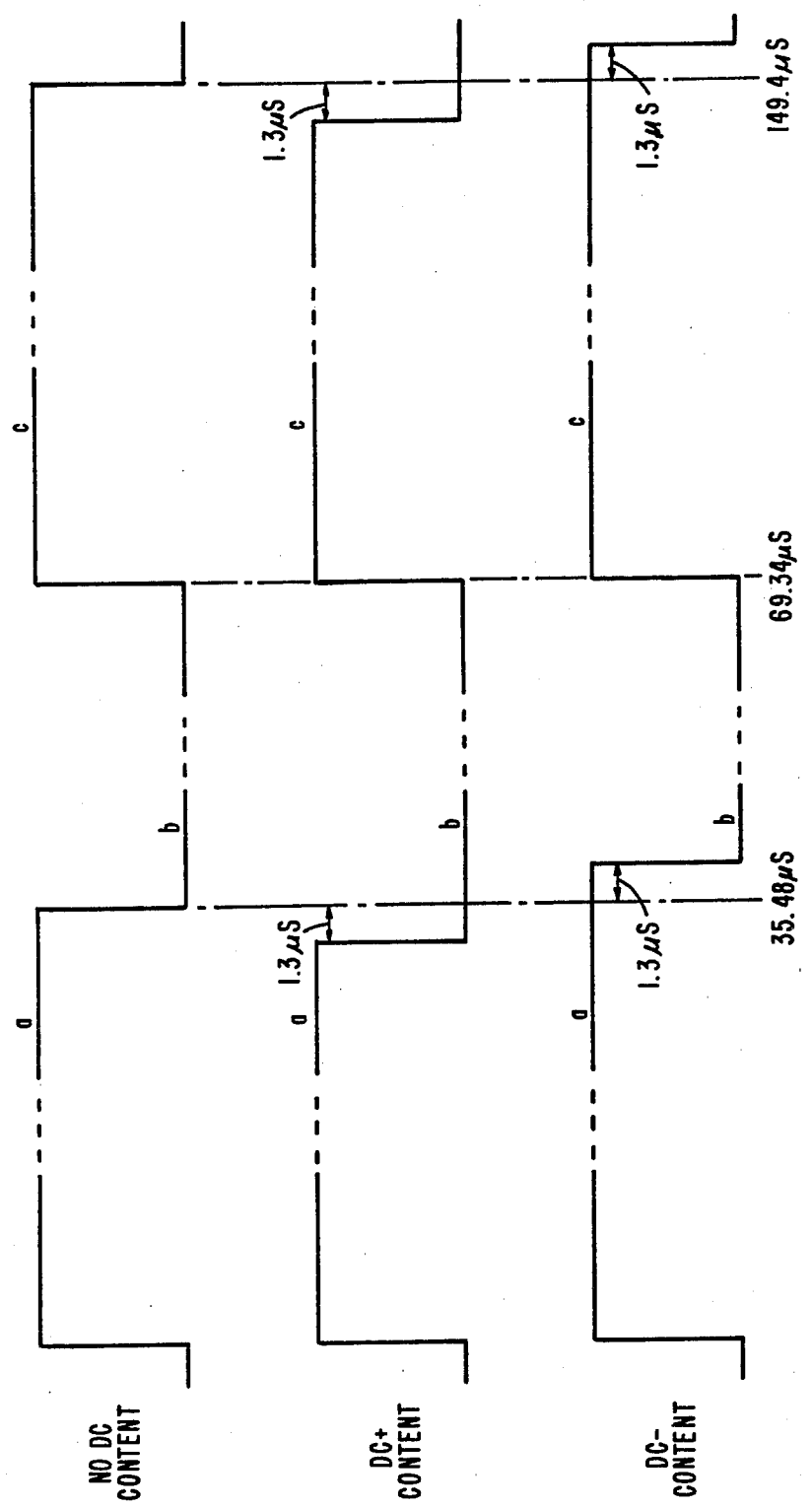
FIG. 6 is a diagram illustrating the manner in which the signals and waveforms of FIG. 5 are modified in accordance with the teachings of the invention to remove the DC content from the inverter output.

Since the DC content in the AC output of the inverter is the result of the generation of unequal volt-seconds of output of opposite polarity, the DC content can be eliminated by a controlled generation of additional volt-seconds of the required polarity. This can be accomplished by shortening the intervals during which the inverter output is of the same polarity as the DC content and lengthening those of the opposite polarity. Thus, as shown in FIG. 6, the positive intervals a and c are shortened to accommodate for positive DC content while the negative interval, b in the example, is lengthened. In the example given, the adjustments are all 1.3 microseconds or four clock pulses. This incremental adjustment was selected since it provides good corrective response without introducing unacceptable levels of distortion. Only the intervals a–d are adjusted in duration. No correction is applied to the interphase interval e.

Figure 7:
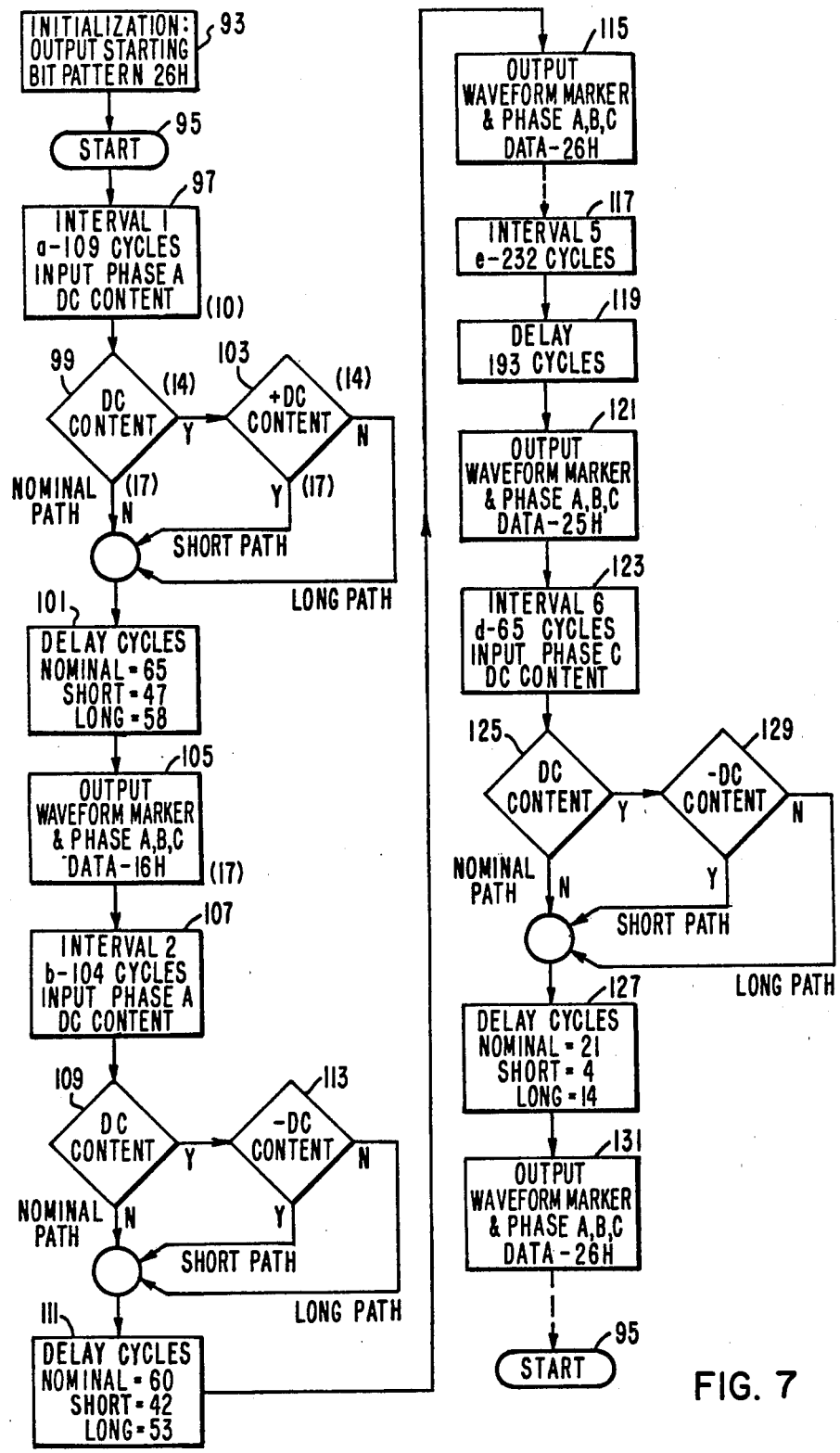
FIG. 7 is an abbreviated flow chart of the program used by the waveform generator of FIG. 3 which enables it to produce the pulse pattern of FIG. 5 with pulse width modulation as shown in FIG. 6.

A flow chart for the computer program needed to operate the microprocessor to develop the above-described pulse width modulated waveforms is shown in FIG. 7. Upon start-up, the program is initialized as indicated in block 93. This step sets up the microprocessor to begin generating the timing intervals and includes outputting to the CCFT driver 13 the 8-bit binary number which sets the conduction states of the transistors to generate the waveforms beginning at zero electrical degrees for phase A. That is, the pattern begins at the time t=0 in FIG. 5. This binary number is selected such that bits 0 and 4 of the EPROM output shown in FIG. 3 are set to turn on the positive half cycle transistors for phases A and C and the negative half cycle transistor for phase B. Bit 6 of the EPROM output which generates the waveform marker is low at this point. The binary number that produces this EPROM output is the hexidecimal number 26H, as indicated in block 93.

The initialization block in FIG. 7 is followed by a START block 95, which provides a path for the program to continuously repeat itself once it has been initiated. Generation of interval No. 1, which is a positive polarity "a" inteval associated with phase A and has a nominal duration of 109 clock cycles, is initiated in block 97 by inputting the phase A DC content signals into the input port of the EPROM (see FIG. 3). If there is no DC content in the phase A output waveform as determined in block 99, the program proceeds along the "nominal path" through the delays of block 101. If, on the other hand, there is DC content in the phase A output, a determination is made in block 103 as to whether the DC content is positive or not. If the DC content is positive, the program takes the short path through the delays of block 101; but if it is not, it takes the long path. The approximate delay cycles for the nominal, short and long paths are shown in block 101. Upon completion of the appropriate delay, a new binary number, 16H, is outputted from the EPROM output port. This binary number is selected such that the phase A output signal goes from high to low while the phase B, C and waveform marker signals do not change state.

The number of clock cycles required for each for the functions carried out in blocks 97, 99, 103 and 105 are shown in parentheses next to the block. In the decision blocks 99 and 103, it can be seen that 14 clock cycles are required if the answer is "yes, " but 17 are required if the answer is "no." By adding the number of clock cylces required for blocks 97, 99 and 105 to the 65 cycles indicated in block 101, it can be seen that the total number of clock cycles for the nominal path from block 97 to 105 is 109 cycles. Similarly, 105 total cycles are required for the short path and 113 for the long path. Thus, if there is no DC content in the output waveform, interval "a" will terminate after 109 clock cycles. If there is positive DC content in phase A, interval "a" will terminate 4 cycles sooner while switching of the transistors will be delayed 4 cycles from the nominal time if the DC content is negative. As discussed above in regard to FIGS. 5 and 6 then, positive DC content shortens the positive interval and negative DC content lengthens it to drive the DC content toward zero.

Following switching of the power transistors in phase A of the inverter, interval No. 2, which is negative polarity "b" interval with a nominal duration of 104 microprocessor cycles, is initiated by again reading the phase A DC content. Again, if there is no DC content as determined in block 109, the program proceeds through the nominal delay path of block 111. This time, however, since the polarity of interval No. 2 is negative, a determination is made in block 113 as to whether the DC content is negative or not. If it is negative, the short path is taken through the delays of block 111. If it is positive, the long path is taken. Thus, the negative polarity pulse is shortened in the presence of negative DC content and lengthened when the DC content is positive. After the appropriate interval, the waveform marker and phase A, B and C drive signals are outputted as indicated in block 115. The binary number outputted in block 115 shifts the phase A signal high again while maintaining the same state for the phase B and C, and waveform marker signals. Since the states of the 4 output signals are again the same as in initialized states, the same binary number, 26H, is used to generate the output signals.

Interval No. 3, being a positive polarity interval associated with phase A, is generated in a manner similar to interval No. 1, except that since it is a "c" interval, the delay cycles are selected so that it has a duration of 246, 242, or 250 cycles depending upon whether no DC content, positive DC content, or negative DC content, respectively, is detected. The output states generated at the completion of interval No. 3 are the same as those generated at interval No. 1 and, therefore, the same binary number, 16H, can be used to generate the output. Since the flow diagram for interval No. 3 is a repeat of the blocks 97, 99, 101, 103 and 105 except for the delay cycles in block 101, as noted above, this portion of the flow chart is not presented in the interests of clarity and economy. Likewise, the flow chart for interval No. 4, which is the same as that for interval No. 2 except for the delay cycles required to generate the "d" interval, is also not presented in FIG. 7.

Interval No. 5 is the "e" interval, which being the interphase pulse is not corrected for DC content. This interval of 232 cylces duration is initiated in block 117 and after a fixed delay of 193 cycles in block 119 is completed by the generation of an output signal in block 121. The binary signal outputted in this block switches the phase C output from high to low and maintains the state of the other outputs.

The next interval, a negative polarlity "d" interval, is initiated in blick 123 by inputting the phase C DC content. As in the case of the intervals Nos. 1 through 4, a determination in block 125 that no DC content is present leads the program through the nominal delay path in block 127. If, however, DC content is detected and it is negative as determined in block 129, the short path is taken through block 127. The presence of positive DC content directs the program through the long path in block 127. At the completion of the selected interval, a binary number is outputted which changes only the state of the phase C signal as indicated by block 131. It will be noted that the states of the four output signals, phases A and C high and phase B and the waveform marker low, are the same as at the completion of interval No. 2 and, therefore, the same binary number, 26H, stored in the EPROM can be used to generate the output.

It should be clear from the discussion above and by reference to the pulse pattern of FIG. 5, the manner in which the flow chart of FIG. 7 can be expanded to illustrate in block form the generation of each of the 54 intervals required to complete a full cycle of the three phase control signals and the waveform marker. Since the three phase signals will not all be high at once or low at once and since the waveform marker can be either high or low, there are twelve binary numbers which must be stored in the EPROM to generate all the combinations of output signals needed to generate the 54 intervals with the waveform marker.

The delays referred to in connection with the flow chart of FIG. 7 are generated by programming the microprocessor to perform operations which require the desired number of clock cycles. By combining these operations with the instructions required to input and output the necessary data and make the decisions regarding the presence and polarity of any DC content, a sequence of microprocessor operating instructions is generated which results in switching of the inverter power transistors at the appropriate instants. A program listing suitable for generating interval No. 1, the positive polarity "a" interval which may be pulse width modulated to compensate for DC content in phase A, is set forth in Table I.

intervals and the number of clock cycles required to perform each instruction. As indicated by line 1 of the program, the DC content signals inputted at the DC port on the EPROM are loaded into register A of the microprocessor in the form of an 8-bit binary number. This instruction requires 10 cycles to execute, as indicated in each of the three columns. In order to correlate the instructions in the program listing with the flow chart of FIG. 7, the subtotal of cycles required for the instructions which perform the function called for in each block of the block diagram are shown to the right in each column of Table I in parentheses, and these subtotals correspond to the cycles shown in parentheses next to each block in FIG. 7. Thus the numeral 10 in parentheses following the first instructions in Table I shows that this instruction carries out the function called for in block 97 of FIG. 7.

Lines 2 and 3 of the program perform the function of determining whether or not there is any DC content in phase A of the inverter output as called for in block 99 of FIG. 7. Line 2 calls for an "and immediate" operation. In this step the second 8-bit byte of the instruction which was stored in address 30H is "anded" with the contents of register A which, it will be recalled, is now loaded with the DC content signals. Since the phase A positive or negative DC content is represented by bits 5 and 4, respectively, of the number in register A, bits 5 and 4 of the second byte of the ANI instruction are made equal to one while all the other bits are made zero. This, in effect, masks the other bits of register A so that only the phase A DC content is analyzed. In carrying out the ANI instruction, the microprocessor compares each bit of register A with the second byte of the instruction and generates a one for each bit in the resultant only if both compared bits are ones. Thus, the 8-bit resultant will be all zeroes unless bit 5 or 4 in register A is a one, indicating the presence of DC content in phase A. This ANI instruction requires seven cycles.

The JZ instruction on line 3 of the program is a jump if zero command. Thus, if there is no DC content in the

TABLE I

| | | PROGRAM LISTING FOR INTERVAL NO. 1 (a - 109 CYCLES NOMINAL) | | | | | | |
|---|---|---|---|---|---|---|---|---|
| | | SOURCE STATEMENT | NOMINAL PATH (Clock Cycles) | | SHORT PATH (Clock Cycles) | | LONG PATH (Clock Cycles) | |
| 1 | | IN    DC PORT | 10 | | 10 | | 10 | |
| 2 | | ANI   30H | 7 | (10) | 7 | (10) | 7 | (10) |
| 3 | | JZ    NOMIN | 10 | | 7 | | 7 | |
| 4 | | ANI   20H | | (17) | 7 | (14) | 7 | (14) |
| 5 | | JNZ   SHORT | | | 10 | | 7 | |
| 6 | | MVI   A, 0 | | | | (17) | 7 | (14) |
| 7 | | MVI   C, 1 | | | | | 7 | |
| 8 | | JMP   LONG | | | | | 10 | |
| 9 | SHORT: | CZ    P109 | | | 9 | | | |
| 10 | | MVI   C, 1 | | | 7 | | | |
| 11 | | JMP   LOOP | | | 10 | | | |
| 12 | NOMIN: | MVI   C, 2 | 7 | | | | | |
| 13 | LONG: | MVI   A, 0 | 7 | | | | 7 | |
| 14 | | DCX   D | 6 | | | | 6 | |
| 15 | LOOP: | DCX   D | 6 | 6 | 6 | | 6 | |
| 16 | | NOP | 4 | 4 | 4 | | 4 | |
| 17 | | DCR   C | 4 | 4 | 4 | | 4 | |
| 18 | | JNZ   LOOP | 10 | 7 | 7 | | 7 | |
| | | | | (65) | | (47) | | (58) |
| 19 | | MVI   A, 16H | 7 | | 7 | | 7 | |
| 20 | | OUT   DRIVE | 10 | | 10 | | 10 | |
| | | | | (17) | | (17) | | (17) |
| | | | | 109 | | 105 | | 113 |

In Table I, the source statements are followed by three columns indicating which instructions are carried out in the generation of the nominal, short and long phase A output as indicated by a zero for the resultant of the ANI operation, the program jumps to NOMIN at line 12. This jump instruction requires 10 cycles as indicated in the "Nominal Path" column of FIG. 1. The combined cycle time for the execution of the ANI and JZ instructions is indicated by the "(17)" in line 3 of the program under the "Nominal Path" column and next to the "nominal path" leading out of block 99 in FIG. 7.

The 65-cycle delay called for in block 101 of FIG. 7 for the nominal path is carried out by the instructions on lines 12 through 18 of the program. The MVI instruction of line 13 directs the microprocessor to load the number 2 into the C register and requires seven cycles to complete. Lines 13 through 16 are instructions which have no substantive effect other than to require 7, 6, 6 and 4 cycles, respectively, for execution. The DCR instruction of line 17 decrements the C register by 1, leaving 1 in the register and required 4 cycles. The JNZ (jump if not zero) instruction of line 18 causes the program to jump back to LOOP at line 15 since the contents of register C are not zero. This jump requires 10 cycles for execution. The program now performs the instructions on lines 15 through 18 again, except that this time the contents of register C will be zero at line 18 and the program will advance to line 19. Since a jump was not required by the JNZ instruction this time around, the execution time is 7 rather than 10 microprocessor cycles. As indicated in parentheses, the total cycle for this NOMIN portion of the program is 65 cycles.

At line 19 of the program, the MVI instruction moves the stored number 16H into register A in 7 cycles. This binary coded hexidecimal number is then directed by the instruction at line 20 to the output port of the EPROM and I/O device 75 of FIG. 3 to effect appropriate switching of the power transistors. As can be seen from Table I, the entire sequence requires 109 microprocessor cycles.

If there is DC content in the phase A output, the program does not jump at line 3 but proceeds to line 4 taking 7 cycles instead of 10, as indicated under the "Short Path" column in Table I. The determination as to whether the DC content is positive or not is made by the ANI instruction of line 4 which masks all the bits of the A register containing the DC content input except bit 5. If the resultant is not zero, indicating the presence of positive DC content, the JNZ (jump if not zero) instruction of line 5 causes the program to jump to SHORT at line 9. The CZ instruction at this line merely imposes a 9-cycle delay. In line 10, the number 1 is inserted in register C. The program then jumps at line 11 to LOOP and proceeds straight through to the output step at line 21. The total number of cycles for the short path is 105.

If the DC content of phase A is negative, the program proceeds from line 5 to line 6 where register A is set to zero just to take up 7 cycles. In line 7 the C register is set to one, which is significant since the contents of this register are used to determine at line 18 whether the program should make a loop. The JMP (jump) instruction in line 8 causes the program to jump to LONG at line 13. After the instructions at lines 13 and 14 are performed, again just to interpose a delay, the program proceeds straight through steps 15 to 20 to direct the binary number 16H to the output port. As indicated, the total number of microprocessor cycles in the "Long Path" is 113.

From the above it will be clear to those skilled in the art the manner in which program listings are developed to effectuate the appropriate delay for each of the 54 intervals needed to generate the three phase output taking into account the presence of, and polarity of, any DC content in the individual phases. The invention provides a great deal of flexibility since the basic switching pattern or the amount of modulation can be easily varied by modification of the instruction sequences.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is given the full breadth of the appended claims and any and all equivalents thereof.

We claim:

1. Apparatus for generating an AC waveform from a DC source comprising:
    means for generating a series of clock pulses at fixed intervals;
    a pair of electronic switches connected to said DC source to generate an output of one polarity when one of said switches is turned on and an output of the opposite polarity when the other switch is turned on;
    means for filtering the output of said electronic switches to generate a filtered output waveform;
    means for detecting a DC content in the filtered output waveform including the polarity thereof; and
    means for switching said electronic switches such that alternately one is on and then the other with said switching occuring at selected intervals which are multiples of the clock pulses and which produce a sinusoidal filtered output waveform, and for modifying the selected switching intervals in response to the detection of a DC content in said filtered output waveform by delaying by a predetermined multiple of said clock pulses the switching on of the electronic switch which generates an output of the same polarity as the DC component and by advancing by said predetermined multiple of said clock pulses the switching on of the electronic switch which generates an output opposite in polarity to that of the DC content.

2. The apparatus of claim 1 including additional pairs of electronic switches each connected to the DC source such that an output of one polarity is generated when one switch in the pair is on and an output of the opposite polarity is generated when the other switch in the pair is on,
    and wherein said filter means filters the output of each pair of switches to generate a multiphase, filtered output waveform, said detecting means detects any DC content in each phase of the output waveform including the polarity thereof, and said switching means switches said electronic switches of each pair such that alternately one is on and then the other, said switching occurring in only one pair of switches at a time and at switching intervals which are multiples of the clock pulse intervals, and modifies the selected switching intervals which result in the switching of the electronic switches in any phase in which a DC content is detected by delaying by a predetermined multiple of said clock pulses the switching on of the electronic switch which generates an output of the same polarity as the DC content and by advancing by said predetermined multiple of said clock pulses the switching on of the electronic switch which generates an output opposite in polarity to the DC content.

3. A method of generating an AC waveform from a DC source comprising the steps of:
generating a series of clock pulses at fixed intervals of time;
connecting a pair of electronic switches to said DC source to generate an output of one polarity when one of said switches is turned on and an output of the opposite polarity when the other switch is turned on;
switching said electronic switches such that alternately one is on and then the other to generate a pulse output waveform, said switching occurring at selected intervals which are multiples of the clock pulse intervals;
filtering said pulse output waveform to generate a filtered output waveform, said selected intervals being selected such that said filtered output waveform is sinusoidal;
detecting any DC content in said filtered output waveform including the polarity thereof; and
modifying the selected switching intervals in response to the detection of a DC content in said filtered output waveform by delaying by a predetermined multiple of said clock pulses the switching on of the electronic switch which generates an output of the same polarity as the DC content and by advancing by said predetermined multiple of said clock pulses the switching on of the electronic switch which generates an output opposite in polarity to the DC content.

4. The method of claim 3 including the steps of:
connecting additional pairs of electronic switches to said DC source to generate additional output waveforms of one polarity when one switch in said pair is on and of the opposite polarity when the other switch in said pair is on;
switching said electronic switches of each pair such that alternately one is on and then the other to generate a pulse output waveform for each pair of electronic switches, said switching occurring in only one pair of switches at a time and at switching intervals which are multiples of the clock pulse intervals;
filtering said pulse output waveforms to generate filtered output waveforms, said selected intervals being selected such that said filtered output waveforms form a multiphase AC output;
detecting separately any DC content in each phase of the filtered output waveform including the polarity thereof; and
modifying the selected switching intervals which result in the switching of the electronic switches in any phase in which a DC content is detected by delaying by a predetermined multiple of said clock pulses the switching on of the electronic switch which generates an output of the same polarity as the DC content and by advancing by said predetermined multiple of said clock pulses the switching on of the electronic switch which generates an output opposite in polarity to the DC content.

5. A method of generating an AC waveform from a DC source comprising the steps of:
connecting a pair of electronic switches to the DC source to generate an output waveform of one polarity when one of said electronic switches is turned on and of the opposite polarity when the other electronic switch is turned on;
generating a series of clock pulses at a fixed interval of time;
operating a microprocessor in response to said clock pulses to repetitively perform preset sequences of operating instructions, each of which requires a preset number of clock pulses, and to generate a selected binary output at the end of each sequence;
operating each of said electronic switches in response to the binary output to generate a pulsed output waveform, successive switch operations occurring at intervals having durations equivalent to multiples of said clock pulses, and said binary outputs being selected such that one switch is always on and the other is off on an alternating basis;
filtering the pulsed output waveform to generate a filtered output waveform, said sequences of operating instructions each being selected such that the periods of time required to perform said sequences and to generate the binary outputs generate a pulsed output which produces a sinusoidal filtered output waveform; and
detecting any DC content in the filtered output waveform, including the polarity thereof, and wherein operating said microprocessor includes comparing the polarity of any DC content with the polarity of the pulsed output waveform and modifying at least one of the sequences of operating instructions in the presence of a DC content by lengthening the sequence, by an amount equivalent to a multiple of said clock pulses, when the DC content is of opposite polarity to the pulsed output during that sequence and shortening the sequence, by an amount equivalent to a multiple of said clock pulses, when the DC content is of the same polarity as the pulsed output.

6. A method of generating an AC waveform from a DC source comprising the steps of:
connecting a pair of electronic switches to the DC source to generate an output waveform of one polarity when one of said electronic switches is turned on and of the opposite polarity when the other electronic switch is turned on;
generating a series of clock pulses at a fixed interval of time;
operating a microprocessor in response to said clock pulses to repetitively perform preset sequences of operating instructions, each of which requires a preset number of clock pulses, and to generate a selected binary output at the end of each sequence;
operating each of said electronic switches in response to the binary output to generate a pulsed output waveform, successive switch operations occurring at intervals having durations equivalent to multiples of said clock pulses, and said binary outputs being selected such that one switch is always on and the other is off on an alternating basis;
filtering the pulsed output waveform to generate a filtered output waveform, said sequences of operating instructions each being selected such that the periods of time required to perform said sequences and to generate the binary outputs generate a pulsed output which produces a sinusoidal filtered output waveform; p1 connecting additional pairs of electronic switches to said DC source to generate additional output waveforms of one polarity when one switch in said pair is on and of the opposite polarity when the other switch in said pair is on;

operating said microprocessor to repetitively perform preset sequences of operating instructions, each requiring a predetermined number of clock pulses and to output a selected binary output at the end of each sequence;

operating each of said pairs of electronic switches in response to the binary output of said microprocessor to generate a pulsed output for each pair of switches, successive operations of each of said pairs of switches occurring at intervals having durations equivalent to multiples of said clock pulses, and said binary outputs being selected such that one switch in each pair of switches is always on and the other is off on an alternating basis wherein said binary outputs are selected such that switching of the electronic switches is effected in only one pair of switches and, therefore, only one phase for any particular binary output; and filtering the pulsed outputs to generate filtered output waveforms, said sequences of operating instructions being selected such that said filtered output waveforms form a multiphase AC output;

separately detecting any DC content in each of the filtered output phases including the polarity thereof, and wherein operating said microprocessor includes, during at least one sequence of operating instructions which results in generating a binary output that switches the electronic switches in each phase, comparing the polarity of any DC content in that phase with the polarity of the associated pulsed output and modifying the sequence of operating instructions in the presence of a DC content in that phase by lengthening the sequence by an amount equivalent to a multiple of said clock pulses, when the DC content is of opposite polarity to that of the pulsed output and shortening the sequence, by an amount equivalent to a multiple of said clock pulses, when the DC content is of the same polarity as the pulsed output.

7. The method of claim 6 wherein a plurality of sequences of operating instructions which results in the generation of a binary output that switches the electronic switches in each phase in which a DC content is detected is modified in the prescribed manner.

8. The method of claim 7 wherein there are three pairs of electronic switches arranged to generate a three-phase filtered output waveform and wherein said sequences of operating instructions are selected such that the pair of switches associated with each phase is only switched within 30 angular degree either side of the zero crossing points of the associated phase of the three-phase AC output waveform.

9. Apparatus for generating an AC waveform from a DC source, comprising:

a pair of electronic switches connected to the DC source so that with one switch in the pair turned on an output waveform of one polarity is generated, and with the other switch turned on the output waveform has the opposite polarity;

means for generating clock pulses at fixed intervals;

a microprocessor which is operated by said clock pulses to repetitively perform selected sequences of operating instructions, each of which requires a preset number of clock pulses and to generate binary output signals at the end of each sequence;

means responsive to the binary output signals for operating said switches to generate a pulsed output waveform, successive switch operations occurring at intervals having durations equivalent to multiples of said clock pulses, and said binary output signals being selected such that one switch is always on and the other off on an alternating basis;

filter means for filtering the pulsed output waveform to generate a filtered output waveform, said sequences of operating instructions each being selected to generate a binary output signal which causes switching of said electronic switches at intervals that result in a sinusoidal filtered output waveform;

means for detecting any DC content in the filtered output waveform including the polarity thereof;

means for comparing the polarity of the DC content with the polarity of the output waveform being generated and wherein said microprocessor includes means for lengthening the sequence of operating instructions, thereby delaying generation of a new binary output signal to switch the electronic switches by an amount equivalent to a multiple of said clock pulses, when the comparing means indicates that the polarity of the output waveform is opposite to the polarity of the DC content and for shortening the sequence of operating instructions and thereby advancing generation of the new binary output signal to cause switching of the electronic switch by an amount equivalent to a multiple of said clock pulses, when the comparing means indicates that the output waveform is of the same polarity as the DC content.

10. Apparatus for generating an AC waveform from a DC source, comprising:

a pair of electronic switches connected to the DC source so that with one switch in the pair turned on an output waveform of one polarity is generated, and with the other switch turned on the output waveform has the opposite polarity;

means for generating clock pulses at fixed intervals;

a microprocessor which is operated by said clock pulses to repetitively perform selected sequences of operating instructions, each of which requires a preset number of clock pulses and to generate binary output signals at the end of each sequence;

means responsive to the binary output signals for operating said switches to generate a pulsed output waveform, successive switch operations occurring at intervals having durations equivalent to multiples of said clock pulses, and said binary output signals being selected such that one switch is always on and the other off on an alternating basis;

filter means for filtering the pulses output waveform to generate a filtered output waveform, said sequences of operating instructions each being selected to generate a binary output signal which causes switching of said electronic switches at intervals that result in a sinusoidal filtered output waveform;

additional pairs of electronic switches connected to said DC source to generate additional output waveforms of one polarity when one switch in each additional pair is on and of the opposite polarity when the other switch in each additional pair is on;

means for connecting the binary output of the microprocessor to each of the electronic switches and wherein said filter means includes means for filtering the output of each pair of switches to form multiple filtered output waveforms and wherein the sequence of operating instructions performed by the microprocessor and the binary output generated thereby are selected such that successive operations of each pair of switches occur at intervals having durations equivalent to multiples of said clock pulses, and one switch in each pair is always on and the other off on a reciprocal basis and the multiple filtered output waveforms form a multiphase output waveform; and means for detecting any DC content in each phase of the output waveform including the polarity thereof, and wherein said microprocessor generates binary outputs which result in the switching of only one pair of switches for each binary number and includes means for modifying each sequence of operating instructions which ends in the generation of a binary output which switches a pair of electronic switches in a phase having a DC content, by lengthening the sequence by an amount equivalent to a multiple of said clock pulses, when the output waveform of that phase has a polarity opposite to that of the DC content and shortening the sequence by an amount equivalent to a multiple of said clock pulses, when the polarities are the same.

* * * * *